United States Patent

[11] 3,618,718

[72] Inventors Andrew Blaauw
  Winneconne;
  Paul H. Stibbe, Neenah, both of Wis.
[21] Appl. No. 45,142
[22] Filed June 10, 1970
[45] Patented Nov. 9, 1971
[73] Assignee J. I. Case Company
  Racine, Wis.

[54] BRAKE ACTUATED RETURN TO NEUTRAL MECHANISM
  9 Claims, 5 Drawing Figs.
[52] U.S. Cl. .................................................. 192/4 B,
  192/4 C, 188/67, 74/531
[51] Int. Cl. ............................................. F16h 45/02
[50] Field of Search .......................................... 192/4 B, 4
  A, 4 C; 74/529, 481, 483, 531

[56] References Cited
UNITED STATES PATENTS
| | | | |
|---|---|---|---|
| 2,936,864 | 5/1960 | Schjolin et al. ............... | 192/4 C X |
| 3,349,860 | 10/1967 | Ross ........................... | 192/4 B X |
| 3,390,523 | 7/1968 | Heidemann et al. .......... | 192/4 B X |

Primary Examiner—Benjamin W. Wyche
Attorney—Cullen, Settle, Sloman & Cantor

ABSTRACT: A hydrostatic transmission control linkage having a shift lever movable towards a drive position and a neutral position and to which is attached a friction plate adapted to normally retain the lever in the drive position by means of frictional contact with a plunger yieldably urged against the plate. The plunger is attached to one end of an actuating linkage, the other end of which is secured to a brake pedal in such a manner that, by depressing the brake pedal, the frictional contact between the friction plate and the plunger will be broken to automatically cause movement of the shift lever into the neutral position.

PATENTED NOV 9 1971 3,618,718

INVENTORS.
ANDREW BLAAUW.
PAUL H. STIBBE.
BY:
CULLEN, SETTLE, SLOMAN & CANTOR.
ATT'YS.

3,618,718

BRAKE ACTUATED RETURN TO NEUTRAL MECHANISM

BACKGROUND OF THE INVENTION

The present invention relates to a transmission and brake control mechanism for vehicles and more in particularly to a combination hydrostatic transmission control and brake mechanism control linkage.

Some hydrostatis transmissions are known to have a tendency due to internal forces when operating to shift to neutral. Most of the known systems adapted to counteract this tendency primarily either depend upon complicated mechanism or on positive locking mechanisms associated with the shift lever to counteract the tendency of the internal transmission forces to seek a neutral position. These prior systems are costly in design and manufacture and depend on manual operation of the shift lever from a drive position to the neutral position or vice versa.

SUMMARY OF THE INVENTION

In the present invention, the neutral seeking tendency of a hydrostatic transmission is used to advantage by utilizing its return to neutral tendency when the brake is applied. A friction plate is attached to the transmission shift lever and moves with the shift lever. A brake linkage, which at one end is attached to the brake pedal, has a plunger attached at the other end and a coil spring is disposed around the plunger to apply a force on the plunger as well as to return the brake pedal. When the brake pedal is not depressed, the plunger applies a force against the friction plate, which in turn is held by friction against a support bracket, and thereby prevents the shift lever at the transmission from shifting into neutral. However, when the brake is applied by depressing the brake pedal, the plunger will be moved away from the friction plate against the force of the coil spring thereby releasing the friction plate and permitting the shift lever to automatically return to neutral.

The present invention is of particular utility for incorporation in small vehicles, such as garden variety tractors in which the incorporation of a hydrostatic transmission has become more and more prevalent.

The output shaft of the transmission is usually directly connected to the axle of the rear or propelling wheel of the tractor with a control on the transmission being selectively positionable in forward, neutral or reverse settings to allow the tractor to be propelled in forward or reverse directions. Conventional hydrostatic transmissions of this type include a pump which is driven by a prime mover, such as an internal combustion engine or the like, with the pump providing fluid under pressure to a motor that drives the output shaft of the transmission. The pump and motor of the transmission are connected in a closed hydraulic circuit, with the pump output flowing in one direction during forward rotation of the motor and in an opposite direction during reverse rotation of the motor.

As mentioned previously, because of the internal forces due to the pump pressure, the transmission seeks to find a neutral position, if not restrained by locking the shift lever in the respective drive position. When the brake is applied, the transmission must be shifted into neutral to prevent damage to the internal mechanism. There is also a safety factor involved in that, if the transmission is not returned to neutral, the tractor engine would tend to stall, requiring restarting. Thus, placing transmission in neutral when the brake is released, requires less brake capacity and reduces the size of the components. Ordinarily, two operations are necessary to be made by the operator: (1) applying the brake pedal and (2) simultaneously shifting the shift lever to the neutral position.

The above disadvantage of having to shift to neutral whenever the brakes are applied and which can be easily forgotten by the operator, has been eliminated by the provision in the present invention.

Other obvious advantages and novel features of the present invention will become evident by the following detailed disclosure having reference to the appended drawings.

BRIEF DESCRIPTIONS OF THE DRAWINGS

The accompanying drawings schematically illustrate a preferred embodiment of the present novel control mechanism, in which.

DESCRIPTION OF THE PREFERRED EMBODIMENT

Figure 1:
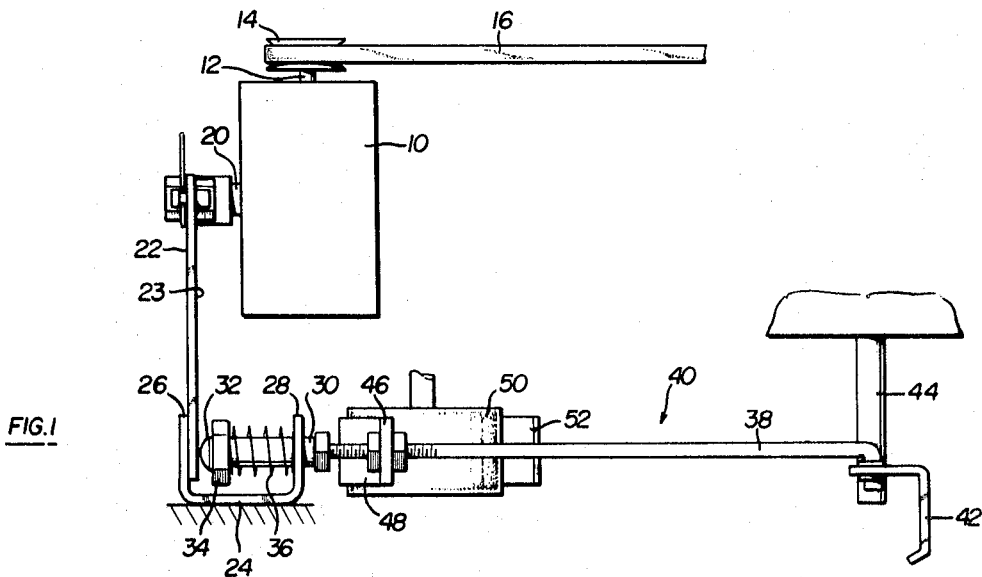
FIG. 1 is a schematic top view of the control mechanism.

With reference to the figures in the drawings, the invention is shown applied to a hydrostatic transmission indicated at 10 provided with a power input shaft 12 which is driven by a pulley 14 from an engine drive belt 16 for transmission of rotational forces to the rear or driving wheels of the tractor (not shown) by means of a gear train (not shown). Power input to the transmission is provided in conventional manner by means of a prime mover such as an engine or the like (not shown) and which need not be described any further.

Figure 2:
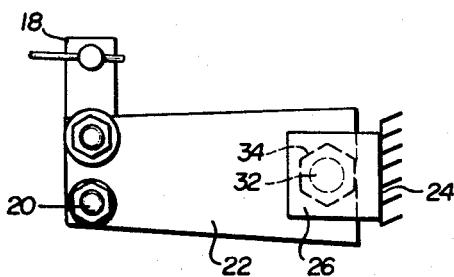
FIG. 2 is a schematic illustration of the operation of the control mechanism illustrated in FIG. 1.

The transmission 10 is provided with a shift lever 18 attached to the end of a rotatable shaft 20 leading into the transmission 10. As seen in FIG. 2, the shift lever 18 is secured to a plate 22 positioned laterally of the transmission and extending into a stationary support member 24, which is attached to the vehicle at a convenient location. The stationary support 24 is provided with spaced opposite flanges 26 and 28 and the plate 22 is shown in FIG. 1, abuts inwardly against the flange 26.

The opposite flange 28 is apertured to slidably receive a plunger 30 extending into the support towards the plate 22. Secured at the end of the plunger 30 is a button 32 which normally contacts the plate 22, urging the plate 22 toward the flange 26. The contact button 32 is adjustably secured to the plunger end by means of a nut 34 which provides a shoulder for a coil compression spring 36 disposed around the plunger 30 between the flanges 26 and 28. The other end of the spring 36 abuts against the inside of the flange 28 to thereby exert a continuous resilient force on the nut 34 to force the button 32 into contact with the plate 22.

The plunger, outwardly of the flange 28, is secured to the end of a rod 38 which forms part of the brake linkage generally indicated at 40. The other end of the rod 38 is attached to a conventional brake pedal 42 which is pivoted at 44 about a stationary part of the vehicle.

Adjacent the end of the plunger 30 outwardly of the flange 28 the rod 38 is adjustably secured to a lug 46 extending upwardly from a brake bank 48 disposed around a brake drum 50. The other end of the brake band 48 is secured to a stationary part of the vehicle at 52.

Figure 3:
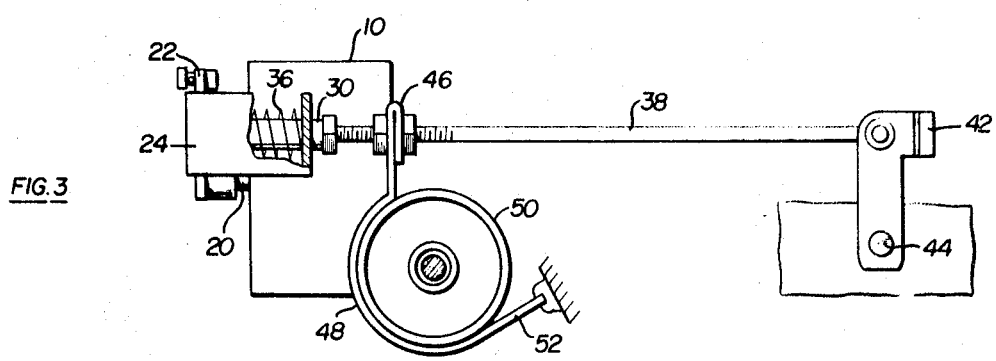
FIG. 3 is a schematic front view of the control mechanism illustrated in FIG. 1.
Figure 4:
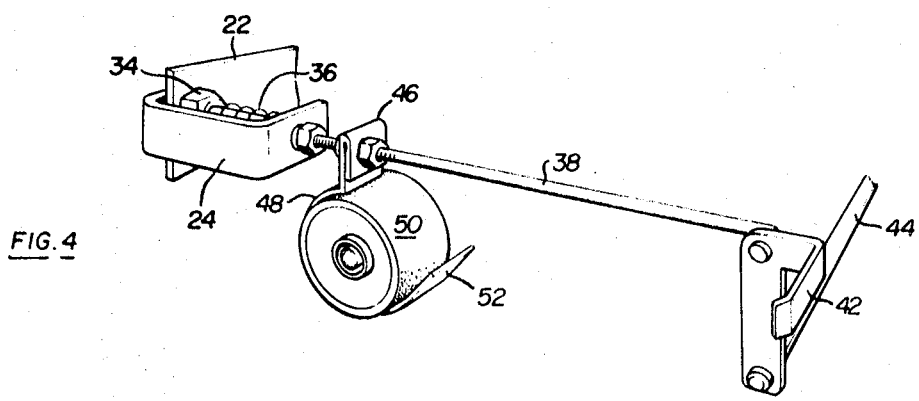
FIG. 4 is a perspective view of the brake linkage and control mechanism illustrated in FIG. 1.

With reference to FIG. 3, when the brake pedal 42 is depressed downwardly, the rod 38 is displaced longitudinally moving the brake band 48 against the rotating brake drum 50 to stop travel of the vehicle. It will be understood that the brake 50 is attached to a ground-engaging wheel of the vehicle.

Figure 5:
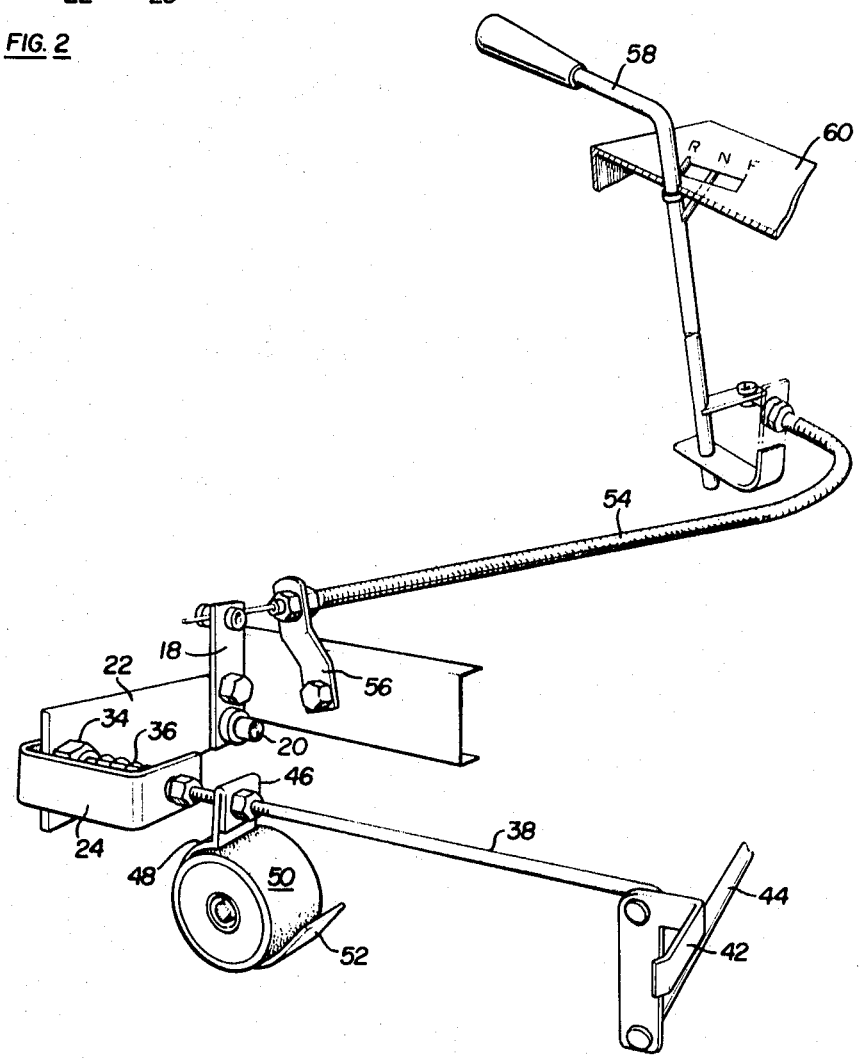
FIG. 5 is an enlarged perspective view similar to FIG. 4 illustrating the interconnection between the hand control lever and the shift lever at the transmission.

With reference to FIG. 5, the shift lever 18 is positioned in the drive position, either reverse or forward, as the case may be, by means of a shift linkage or cable arrangement 54 attached to the shift lever 18. The conduit cable 54 is supported in a stationary bracket 56 attached to a part of the vehicle and the inner wire is pivoted at one end to the lever 18 and its other end is secured to a hand control lever 58 rotatably supported in the control panel 60 of the vehicle and having a pointer 62 to indicate the respective shifted position of the transmission.

In the drive position of the transmission 10, the brake pedal 42 is in the released position, as shown in FIG. 3, to permit free rotation of the brake drum 50. Since no opposite force is present acting on the brake rod 38, the coil compression spring 36 expands, moving the button 32 against the surface 23 of the friction plate 22 which is forced into frictional abutment against the flange 26 of the support 24 to thereby frictionally retain the shift lever 18 and hand control lever 58 in the selected drive position.

The friction force exerted on the plate 22 by the button 32 is dependent on the expansion force of the spring 36 which can be modified by the adjusting nut 34. Preferably, the contact button 32 is made of a hard, synthetic material such as nylon, Teflon or the like, in order to reduce wear on the plate 22 and on the button 32.

If it is desired to stop the vehicle by application of the brake 50, the brake pedal 42 is depressed downwardly whereby the brake rod 38 is forced to move longitudinally in the direction of movement of the brake pedal causing engagement of the brake band with the brake drum 50. Simultaneously, the plunger 30 is moved outwardly of the support 24 against the force of the spring 36, causing disengagement of the button 32 from the plate 22. The plate 22 is now free to move pivotally, permitting the shift lever 18 to return to the neutral position automatically, due to the neutral seeking tendency of the hydrostatic transmission 10, as explained previously. This tendency of the transmission 10 to return to neutral under load is caused by the braking force and the increase of internal fluid pressure. As the shift lever 18 returns to neutral the cable 54 attached to the shift lever causes the hand control lever 58 to also return to neutral thereby indicating to the operator that the transmission is now in neutral.

Thus, it is evident that the present invention has provided a simplified interrelated brake and transmission control mechanism which normally frictionally retains the transmission in the drive position but which, by application of the brake, causes the frictional retaining force to be removed to permit the transmission to automatically shift into a neutral position.

The present transmission and brake control arrangement requires a minimum number of elements which are easily assembled and disassembled. The present control arrangement also eliminates the need for manually operable neutral shift selector positions.

Although the present invention discloses only one preferred embodiment, it will be obvious to the person skilled in the art to which the invention pertains to make various changes and modifications therein without departing from the spirit and essential characteristic of the invention, as defined by the scope in the appended claims.

What is claimed is:

1. In a control mechanism for a hydrostatic transmission having a shift lever movable between a first and a second position, said shift lever normally being retained in the first position by a force and having a tendency to move to said second position when said force is removed, a plate member attached to the shift lever for movement therewith, said plate member having a friction surface, a control member supported for longitudinal movement in a direction toward and away from said plate member, a plunger attached to one end of the control member adjacent said plate member, resilient means normally urging said plunger against said friction surface of the plate member to thereby retain said shift lever in the first position, said resilient means being yieldable to accommodate movement of said plunger away from said friction surface of said plate member allowing movement of said shift lever to said second position; the improvement wherein said control member comprises a linkage attached at one end to a brakepedal, the other end of said linkage being supported in a stationary support, said plunger being provided at the extreme end with a button adapted to frictionally contact said friction surface of said plate member.

2. In a control mechanism as defined in claim 1, said resilient means comprising a spring disposed between said button and said stationary support to constantly urge said button toward said plate.

3. In the control mechanism as defined in claim 2, said button being adjustably secured to said plunger by means of a nut, said nut forming a collar around said plunger to provide an abutment for said spring opposite from said stationary support.

4. In combination with a self-neutralizing hydrostatic transmission and brake control mechanism comprising a transmission shift lever movable between a first driving position and a second neutral position, and a brake pedal connected to a linkage for brake actuation, said linkage having a free end, the improvement of friction means connecting said lever with said linkage, said friction means comprising a first member attached to said lever and a second member attached to the free end of said linkage, and means urging said first and said second members into frictional contact to retain said lever in the first driving position, said means being yieldable to a force applied on said brake pedal to decrease frictional contact between said first and said second member to thereby free said lever for movement to said second neutral position.

5. The combination as defined in claim 4, in which said first member comprises a plate having a free end provided with friction surface and said second member comprising a plunger attached to the free end of said linkage having an end comprising a button for contact with said friction surface on said plate.

6. The combination as defined in claim 5, said means urging said first and said second member into frictional contact comprising a spring disposed around said plunger.

7. The combination as defined in claim 6, in which said free end of said linkage is supported in a stationary support, said stationary support comprising opposite space flanges, said plate means and said plunger being disposed between said flange, a collar adjustably disposed around said plunger adjacent said button, said spring means being disposed between said collar and one of said flanges to urge said plunger and said button towards the opposite flange to thereby frictionally clamp said plate between said opposite flange and said button.

8. In a control system for a tractor equipped with a self-neutralizing hydrostatic transmission having a shift lever movable between neutral and tractor-driving positions, said tractor also having a brake linkage, the improvements comprising a plate movable with said shift lever, a detent biased by a spring into engagement with the plate to normally prevent movement of said detent and said brake linkage, so that actuation of the brake linkage moves the detent against the bias of the spring to allow the shift lever to move to its neutral position.

9. In the combination defined in claim 8, said means interconnecting said detent and said brake linkage comprising a plunger attached to said linkage, said detent comprising a button retained at the end of said plunger an yieldably urged against said plate in frictional contact therewith to normally restrain said lever against movement from a driving position to a neutral position, said brake linkage also having a brake pedal adapted for actuation of said linkage to apply said brake and simultaneously release said frictional contact between said plate and said button to permit movement of said lever to said neutral position.

* * * * *